March 11, 1941. J. G. BAUMGARTNER 2,234,641
BRUSHMAKING MACHINERY
Filed April 30, 1938 7 Sheets-Sheet 1

Inventor:
John G. Baumgartner.
By: Foorman L. Mueller
Atty

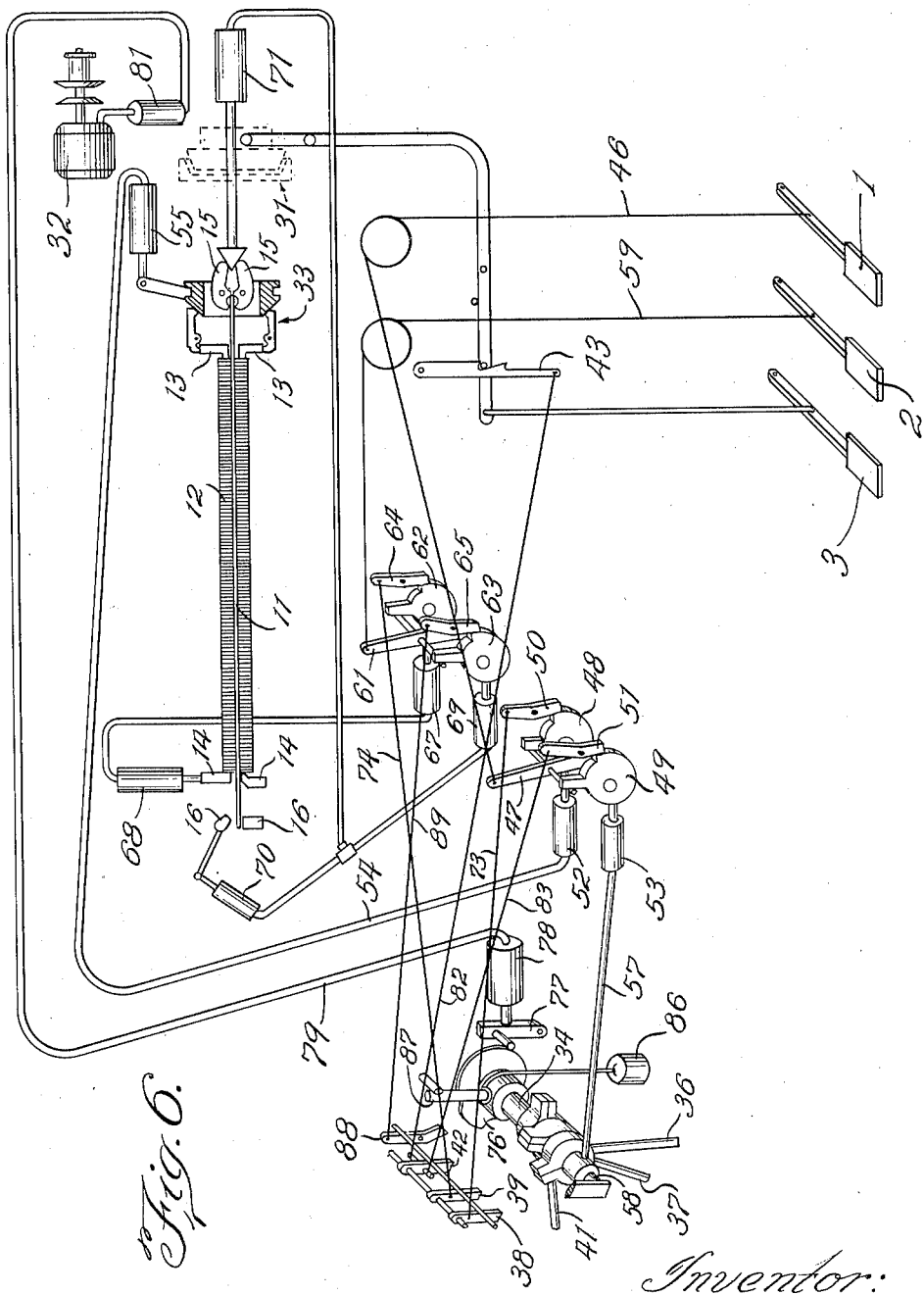

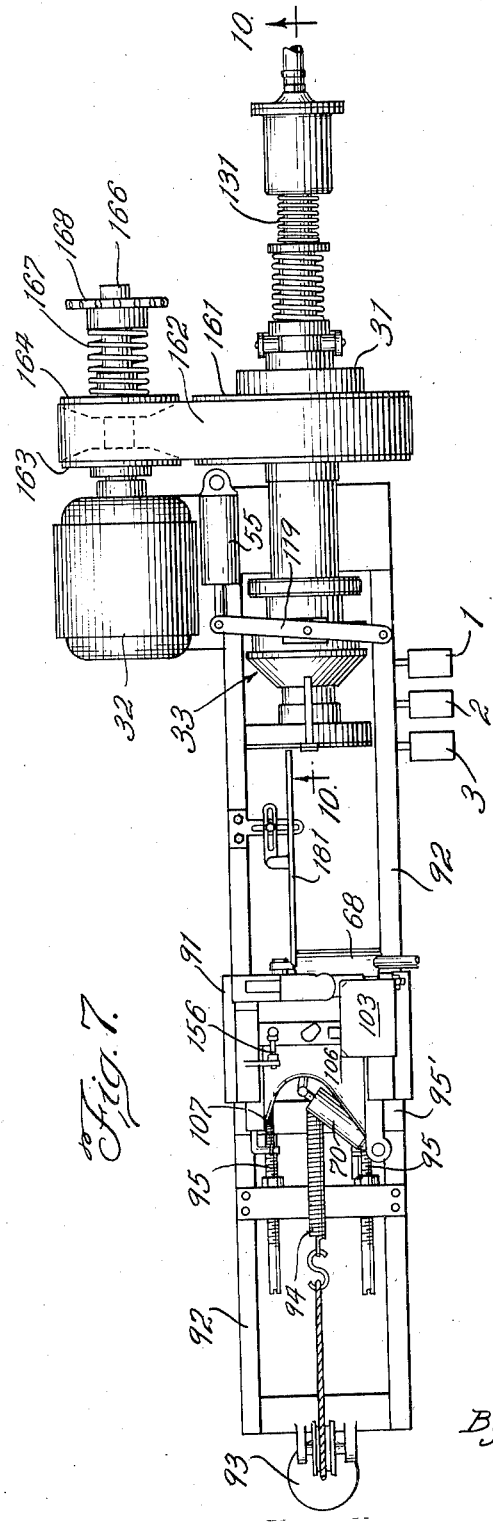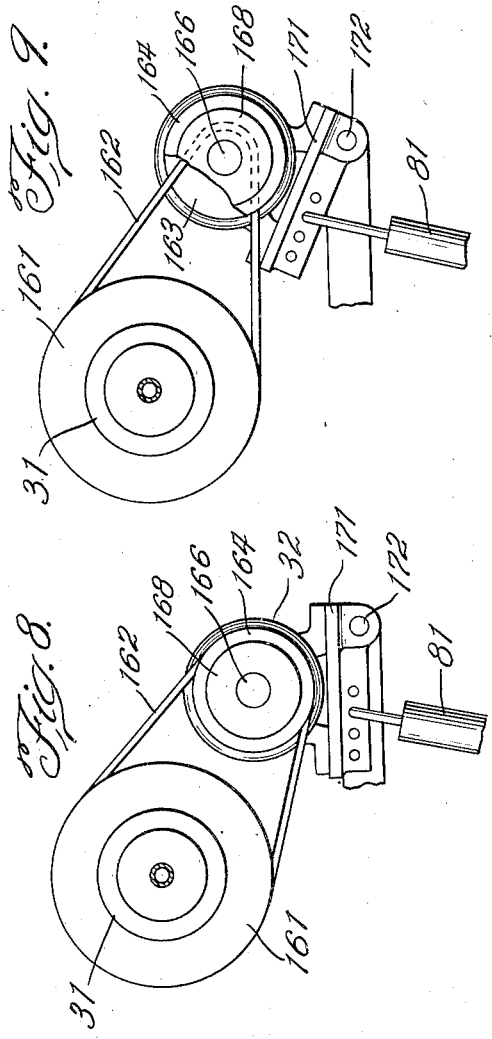

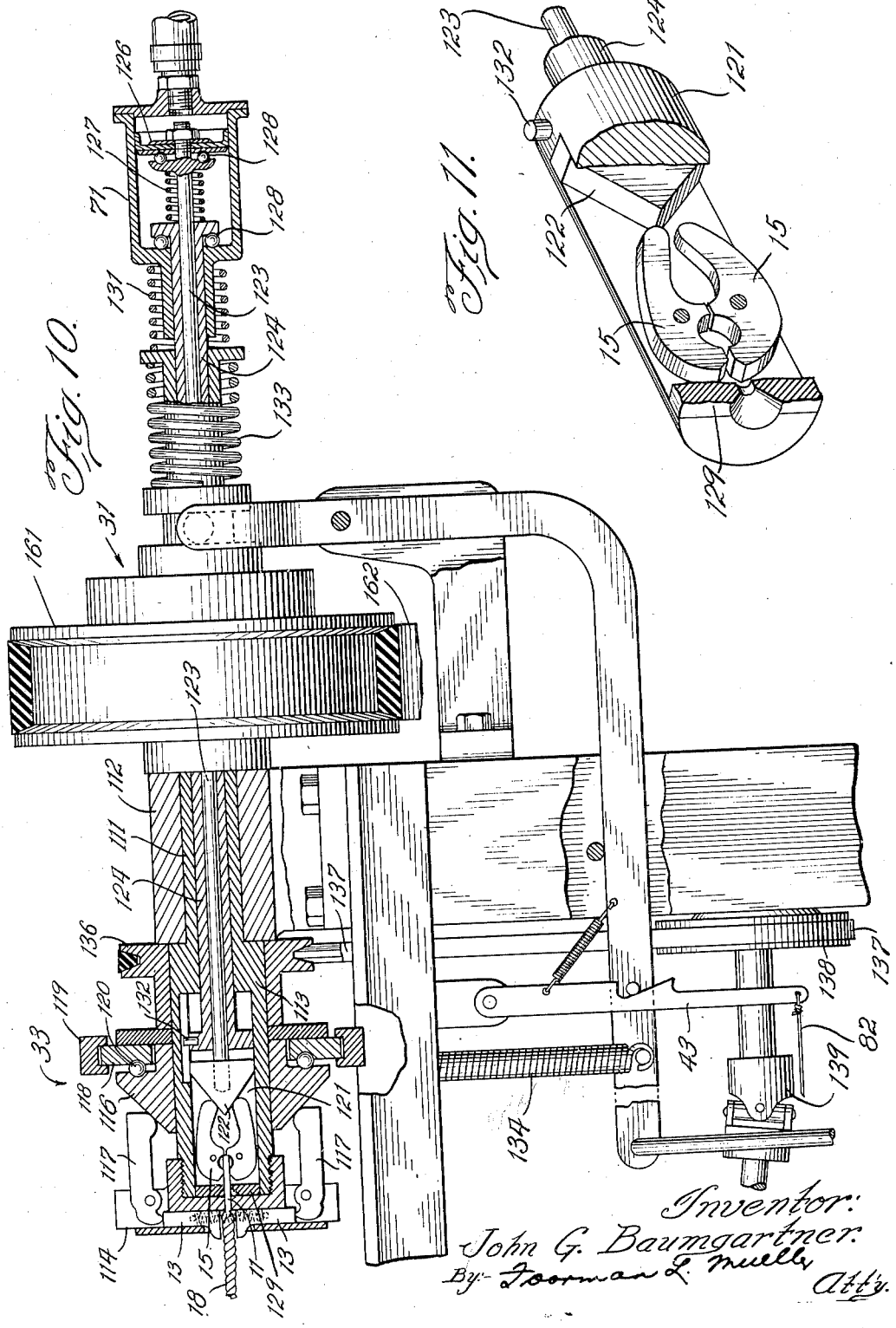

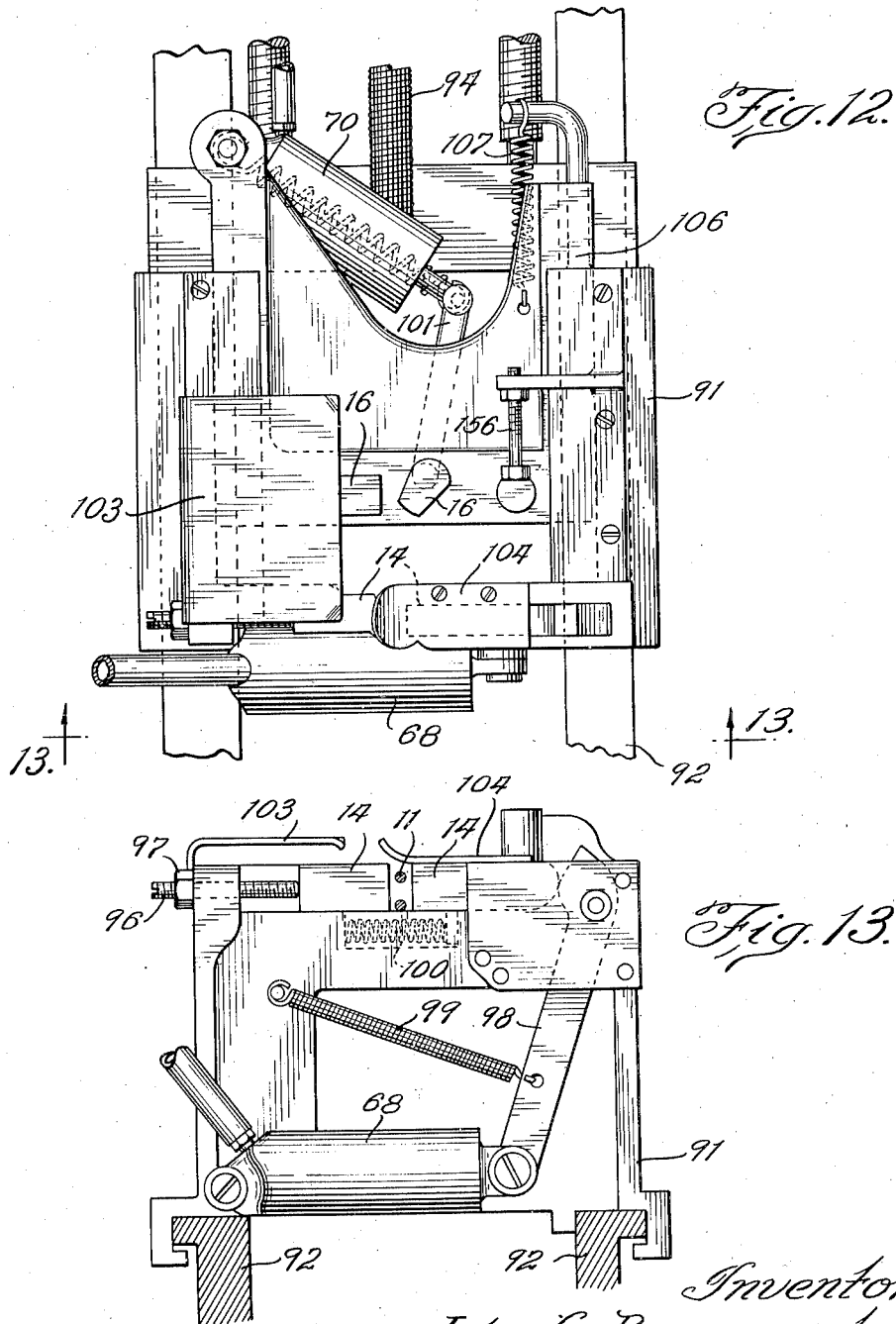

March 11, 1941. J. G. BAUMGARTNER 2,234,641
BRUSHMAKING MACHINERY
Filed April 30, 1938 7 Sheets-Sheet 6
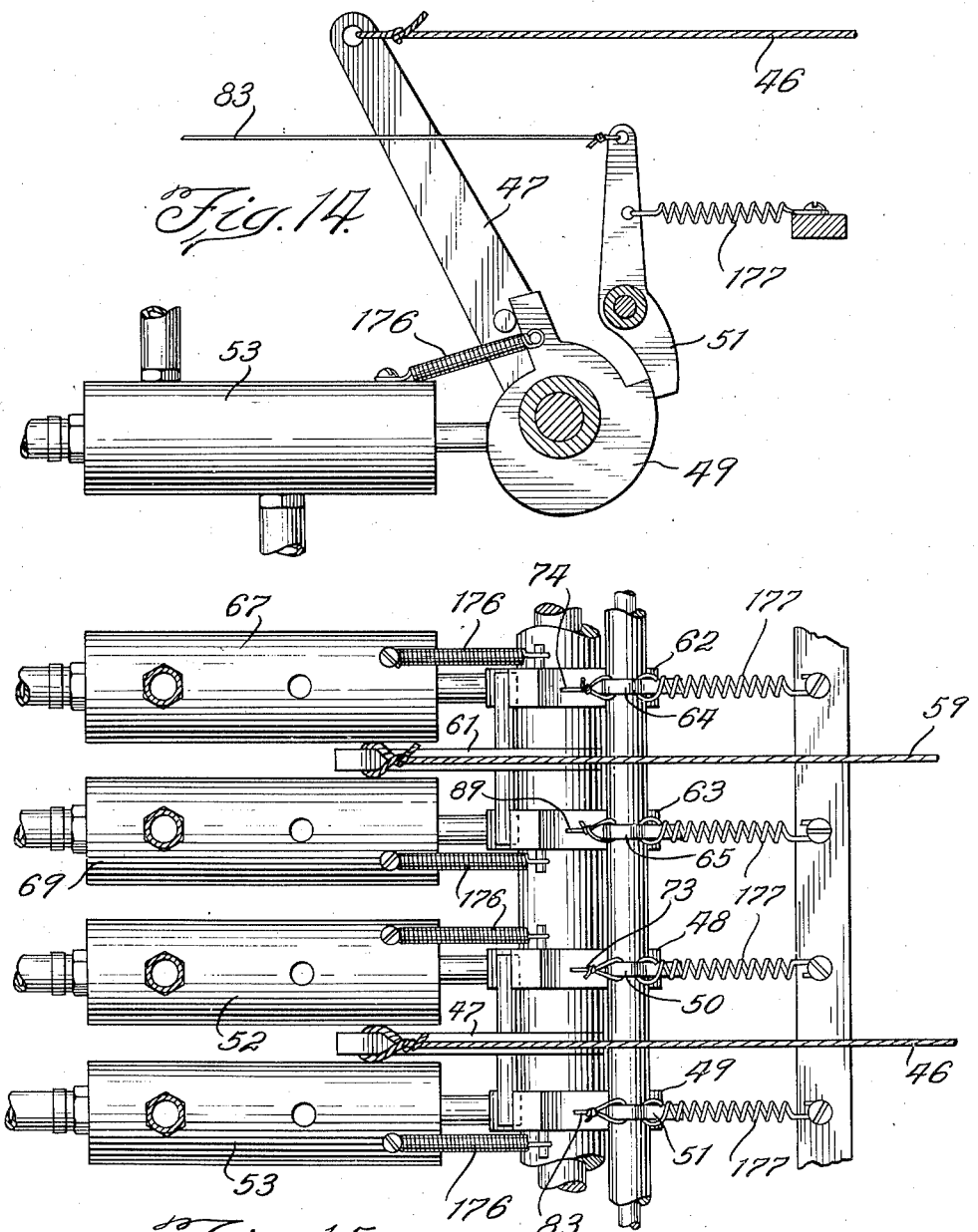
Inventor:
John G. Baumgartner.
By- Foorman L. Mueller
Atty.

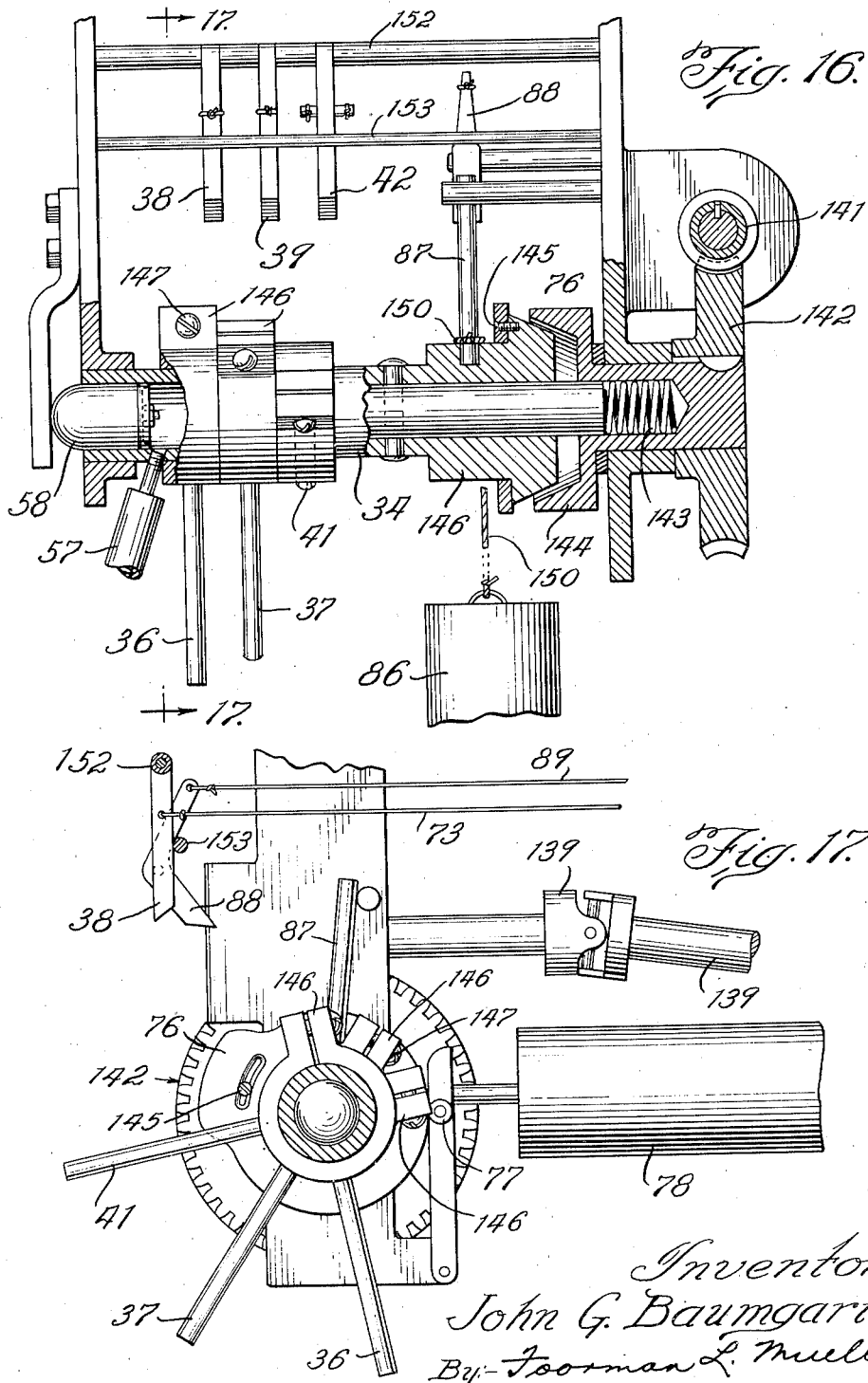

Patented Mar. 11, 1941

2,234,641

UNITED STATES PATENT OFFICE 2,234,641

BRUSHMAKING MACHINERY

John G. Baumgartner, Aurora, Ill., assignor to National Brush Company, Aurora, Ill., a corporation of Illinois Application April 30, 1938, Serial No. 205,187

28 Claims. (Cl. 300—2)

This invention relates to machines for forming brushes of the type in which bristles are held between twisted wires, and it has been illustrated as embodied in a machine which is adapted in a single continuous and automatic operation to twist the bristle-holding portions of the wires to the maximum degree of tightness and at the same time twist the extending portions of the wires tightly, but not so tightly as to break the same.

Wire twisting machines have been provided heretofore for twisting together two wires, between which the bristles of a brush are secured. Unless special care was taken, involving rather costly manual manipulations and loss of some bristles, such machines would make no differentiation between the portions of the wires holding the bristles and the extending portions of the wires which are used for mounting the completed brush. In manufacturing low price brushes the practice has been to simply insert the ends of the wires in the twisting machine and twist the wires as much as was practicable in this manner. A characteristic of brushes twisted in this manner has been that the wires were too loosely twisted in the vicinity of the bristles, even though they were twisted unnecessarily tightly in the extensions. It so happens that the extensions twist much more readily than the bristle-holding portions, and before enough twisting force can be applied to twist the bristle-holding portions as tightly as desired, the extensions break. In the more expensive brushes this difficulty has heretofore been overcome by readjusting by hand the machine and the brush after a preliminary twisting so that the machine would grip the wires adjacent to the bristle-holding portions thereof so as to apply more twisting force to these portions of the wires than to the extensions. When the bristle-holding portions of the wires are twisted more tightly, they not only hold the bristles more firmly but they bring the bristles so close together that the spiral effect in their positioning is not objectionable. Furthermore, a tightly twisted wire bends more smoothly and evenly than a loosely twisted wire when the brush is bent to the desired shape.

An object of the present invention is to provide a machine which will manufacture the properly twisted brushes substantially as economically as the poorly twisted brushes have been manufactured heretofore. This is accomplished by providing a machine which automatically twists the central or bristle-holding portions of the wires independently of the extensions of the wires. More specifically, the machine includes two pairs of jaws at each end of the two wires. The inner pairs of jaws grip the wires adjacent the bristle-holding portions to twist these portions to the desired degree, after which they release and the outer jaws twist the extensions of the wires to the degree which is desired for this portion of the wires.

Another object of the invention is to provide a machine in which the insertion of the wires in the machine and the insertion of the bristles in the wires is facilitated. According to the present invention this is accomplished by providing clamps into which the wires may be easily inserted, causing a clamp at one end to clamp the wires first in response to movement of a foot pedal, while leaving the other end free to permit the insertion of the bristles, and then clamping the other end in response to foot pedal control when the bristles are in place.

The advantages and objects of the invention will be made more apparent by the following description and by the drawings, in which:

Figs. 1 to 5 are more or less diagrammatic views showing twisting operations. Fig. 1 shows the brush before twisting. Fig. 2 shows the brush after twisting of the central or bristle-holding portion. Fig. 3 shows the completed brush, the inner jaws of the machine having been released while the outer jaws twisted the wire extensions. Fig. 4 shows a brush about to be twisted in a prior art machine with a single pair of jaws at each end. Fig. 5 shows the inferior result of this mode of twisting.

Fig. 6 is a diagrammatic view indicating the general operation of the entire machine of my invention.

Fig. 7 is a plan view of the wire twisting portion of the machine.

Fig. 8 is a view of the Reeves drive in high speed adjustment.

Fig. 9 is a view thereof in low speed adjustment.

Fig. 10 is an enlarged fragmentary longitudinal sectional view taken approximately on the line 10—10 of Fig. 7.

Fig. 11 is a perspective view (partially broken away) of the jaw unit within the twisting head for engaging the ends of the wires.

Fig. 12 is a fragmentary plan view on an enlarged scale of the sliding but non-rotating wire holding carriage.

Fig. 13 is a sectional view taken approximately on the line 13—13 of Fig. 12.

Fig. 14 is a fragmentary side elevation showing the construction of the valve controlling means.

Fig. 15 is a fragmentary plan view of the valve control mechanism.

Fig. 16 is a partly sectional view of the automatic control mechanism.

Fig. 17 is a view taken approximately on the line 17—17 of Fig. 16.

Figure 1:
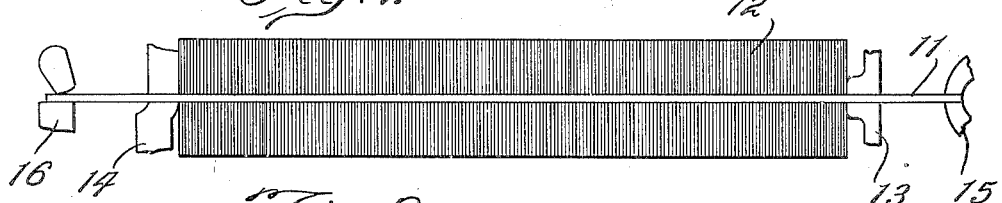

Although this invention may take numerous forms, only one has been chosen for illustration. It is believed that the construction will be understood more readily after the purpose of the machine and its general mode of operation have been explained. As seen from Figs. 1 to 3, the purpose of the machine is to twist a brush blank, shown in Fig. 1, to the condition shown in Fig. 3. The brush blank includes a pair of wires 11, one of which is hidden behind the other in Fig. 1, and suitably arranged bristles 12 held between the wires. Two sets of jaws are provided, the first set including the pairs 13 and 14 and the second set of jaws including the pairs 15 and 16. The jaws 13 and 14 may be called medial jaws since they grasp the wires at inner or intermediate points, namely adjacent the bristle-holding portions thereof. The jaws 15 and 16 may be called end jaws since they grasp the wires at their ends.

*General method of twisting*

During the first portion of the twisting operation all four pairs of jaws grasp the wires, and the jaws 13 and 15 are rotated jointly so that the wires are twisted between the jaws 13 and 14, as indicated at 17. In the second portion of the twisting operation the jaws 13 and 14 are released so that the rotation of jaws 15 twists the extensions 18 of the wires, i. e. the portions of the wires beyond the bristles. The twisting is stopped when the extensions 18 have been twisted to the desired degree, and since the twisting force required to reach this degree of twist in the extensions is less than that which was required to reach the desired degree of twist in the portions 17 in Fig. 2, the second step in the twisting has no effect on this portion 17.

Figure 2:
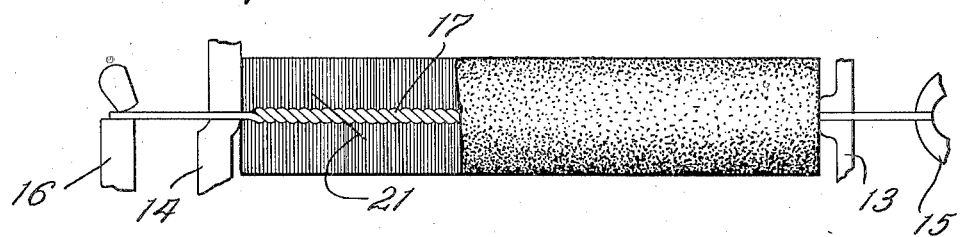
Figure 3:
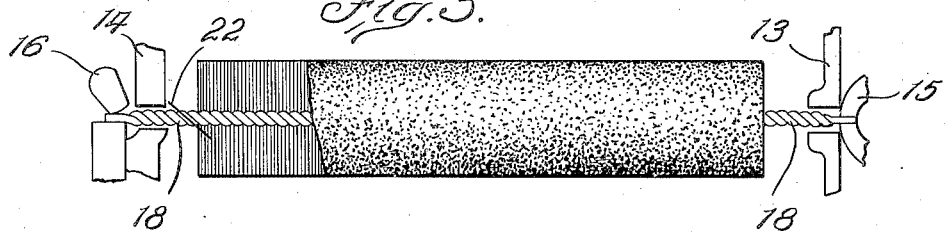

A line 21 has been drawn across the portion 17 in Fig. 2 to indicate the pitch of the twist therein. A similar line 22 (Fig. 3) has been drawn on an extension 18 to indicate the pitch of the twist in this portion of the wire. It will be observed that the pitch is approximately the same in each portion. This is desirable for various reasons. For the sake of simplicity of the drawings, the wire portions 17 have been illustrated in Figs. 2 and 3 as in contact although they would in fact be slightly separated by the bristles.

Figure 4:
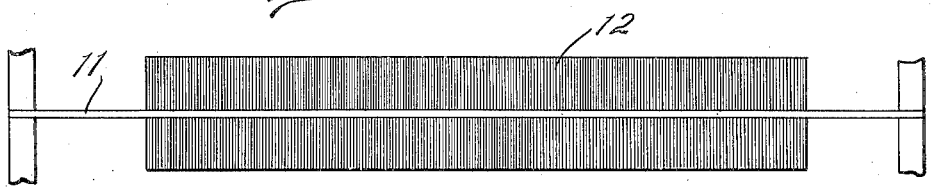
Figure 5:
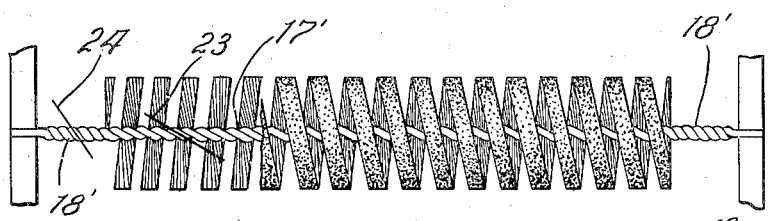

In Fig. 5, in which a brush is illustrated which has been twisted only by a single set of jaws, i. e. one pair at each end, it is seen that the pitch shown by line 23 indicates less twist than the pitch of line 21 indicates, while the pitch indicated by line 24 indicates greater twist than does the pitch indicated by line 22. In other words, the simple method of twisting illustrated in Figs. 4 and 5 will twist the extensions 18' too tight while leaving the bristle-holding portion 17' too loose. The extensions 18 may be twisted to the extent of being too tight and rigid or even to the extent of breaking without twisting the bristle-holding portion 17' as much as desired. When the bristle-holding portion 17' is too loose, it does not bend smoothly and evenly. The convolutions of bristles are too far separated and the bristles may be insecurely fastened especially after the brush has been bent to a desired shape.

*General operation of machine*

The general operation of the machine may be described with reference to Fig. 6. The operator first inserts the two wires 11 into the machine and he presses pedal 1 through the valve control system which will be described later. This causes the medial jaws 13 to close and grip the wires. The operator then flexes one wire away from the other and inserts the bristles 12 between the two wires, which bristles will have been previously arranged in a suitable clamp so that they may be inserted simultaneously and evenly. The operator then releases the sprung wire, and while holding the wires properly spaced to initially position them properly to prevent their breaking during the twisting, he presses pedal 2. This causes the other medial jaws 14 to close and in addition causes the end jaws 15 and 16 to close. The operator then pushes pedal 3, which shifts clutch 31 so as to cause motor 32 to drive the twisting head 33 which includes both jaws 13 and jaws 15. This twists the bristle-holding portion 17 of the wires to the position shown in Fig. 2. While the twisting head 33 is being rotated, control shaft 34 is also being rotated, being connected to the twisting head 33 by any suitable means. As the bristle-holding portion 17 reaches the twisted pitch shown in Fig. 2, the shaft 34 carries the trip arms 36 and 37 into engagement with trip levers 38 and 39 to cause the release of jaws 13 and 14 with the result that the further rotation of twisting head 33 twists the extensions 18 of the wires. When these have been twisted to the pitch shown in Fig. 3, the trip arm 41 engages the trip lever 42 to release latch 43 which has been holding pedal 3 depressed. The release of pedal 3 permits the clutch 31 to disengage so that the twisting of the wires ceases, and as the jaws 15 and 16 are now released the twisted brush may be removed.

*Air control system*

Inasmuch as the jaws are controlled by compressed air, it is desirable at this point to describe the air control system. Depression of the pedal 1 actuates a cord 46 which in turn actuates a pivoted lever 47 to rotate cams 48 and 49 in a clockwise direction. Once actuated, these cams are retained in their actuated positions by pawls 50 and 51 until the latter are released as will be described. The cams 48 and 49 operate valves 52 and 53 respectively. Details of construction are seen best in Figs. 14 and 15, although this description may be followed best in Fig. 6. The valve 52 admits compressed air to a conduit 54 which is connected to cylinder 55 which operates the jaws 13, closing these jaws when valve 52 is opened. Valve 53 admits air to a conduit 57 which is connected to hollow shaft 34 to actuate a plunger 58 (Fig. 16) for thrusting the various trip arms 36, 37 and 41 to such a position that as they are rotated they will strike their respective trip levers 38, 39 and 42. The conduits may consist of or include flexible hosing to permit necessary movement of the connected parts. Pedal 2 actuates cord 59 which in like manner actuates pivoted lever 61 and cams 62 and 63 which are temporarily retained in their actuated positions by pawls 64 and 65. Cam 62 operates valve 67 which supplies air to cylinder 68 for closing jaws 14. Cam 63 actuates valve 69 for supplying air to cylinder 70 which closes jaws 16 and to cylinder 71 which closes jaws 15.

Near the end of the step of twisting the bristle-holding portions 17 it is desirable to retard the rotating speed of the twisting head 33 so as to provide an interval of time for the jaws 13 and 14 to fully retract, so that they will not be in position to smash the bristles at the ends of the bristle-holding portion during the second portion of the complete twisting operation. Whenever it is desired to reduce the speed, such reduction is initiated by cam 76 which strikes the pin or cam follower 77 to actuate valve 78, supplying air to flexible hose 79 and cylinder 81 which actuates a Reeves drive mechanism from the position shown in Fig. 8 to the position shown in Fig. 9 to change the pulley ratio so as to reduce the speed of the twisting head 33.

The next change that takes place occurs when the bristle-holding portions of the wires have been twisted the desired amount. At this time trip arm 36 strikes trip lever 38 to actuate cord 73 and thereby pivot pawl 50 to release cam 48 and allow valve 52 to close, shutting off the air from cylinder 55 and preferably opening a vent to permit the escape of air therefrom. In like manner the trip arm 37 strikes the trip lever 39 and actuates cord 74 and pawl 64 to release cam 62 and valve 67 to cut off the air pressure from cylinder 68 and permit jaws 14 to open.

When the extensions of the wires have been twisted to the desired degree, trip arm 41 strikes trip lever 42, thus actuating cord 82 and releasing latch 43 to permit the clutch 31 to shift to its released position. The trip lever 42 also actuates cord 83 to release pawl 51 and thus release cam 49 and valve 53, the latter cutting off the supply of air to shaft 34 and plunger 58 and opening a vent, thus permitting the shaft 34 to shift axially to its inactive position. This shifting of shaft 34 automatically releases it so that it may be returned to its original position under influence of a weight 86. It is stopped in this position by arm 87, but before it reaches this position the arm 87 acts as a trip arm to trip the lever 88 which actuates cord 89 for releasing pawl 65. The release of pawl 65 releases cam 63 and valve 69 so that the latter shuts off the air and opens the vent to cylinders 70 and 71 to permit jaws 16 and 15 to open, thus releasing the completely twisted brush. The time interval required for weight 86 to entirely rotate the arm 87 corresponds to the time interval required to stop the drive shaft. When arm 88 opens valve to release jaws, the shaft has stopped rotating. The ends of the wires then will be straight when they are released. If the jaws released while rotating, the ends of the wires would be partially caught and twisted out of a straight line. It is easier to put straight wire ends into the brush handle.

With this knowledge of the operation of the machine as a whole the various parts thereof may be described in detail for the purpose of aiding those skilled in the art in reproducing the same, although of course alternative forms of these parts could be provided without departing from the invention.

*Twisting mechanism*

In Fig. 7 may be seen the entire twisting mechanism exclusive of the automatic control features, shown generally in Fig. 6. The clutch 31, the twisting head 33, the motor 32, and the various valves and jaws have already been mentioned. The jaws 14 and 16 together with their actuating cylinders 68 and 70 are carried by a sliding carriage 91 which slides on slide rails 92, being biased away from twisting head 33 by a weight 93 which is connected to sliding carriage 91 by a spring 94. Spring 94 functions to absorb the shock when the sliding carriage 91 reaches the end of its movement as determined by screws 95, which hold a stop plate 95' at their ends.

The jaws 14 and 16 do not rotate and therefore may be operated in a very simple manner. The operation of jaws 14 is seen in Fig. 13, in which it is seen that one of the jaws 14 is fixed and the other is slidable. The position of fixed jaw 14 is controlled by a screw 96 having a locknut 97. Movable jaw 14 may be pressed toward the fixed jaw 14 by operation of the cylinder 68 which actuates cam lever 98 to press the slidable jaw 14 with great force against the fixed jaw 14. Return springs 99 and 100 are provided for returning the cam lever 98 and movable jaws 14 to their original positions when the air pressure is released.

The jaws 16 (Fig. 12) likewise include one fixed jaw and one movable jaw. The movable jaw in this instance may be pivoted and operated by a crank 101 connected to the cylinder 70. Because the movable jaw 16 pivots and might therefore move the wires, it is preferred that the jaws 14 close first. This may be accomplished by having the valve 67 open slightly ahead of the valve 69, although it will be accomplished automatically if they open simultaneously since the valve 69 controls two cylinders and has more conduit to be filled before the cylinders are fully actuated.

To facilitate the insertion of the wires between the jaws 14 and 16 a table 103 may be provided on one side of the sliding carriage 91, and a guide 104 may be provided on the other side of the carriage to guide the wires in between the jaws as they are slid off of table 103. In addition to this guide function for the table 103 and guide 104 they have the important function as safety devices to prevent the operator from catching his fingers in the brush or machine at this point.

When the jaws 14 are released from the wires it is necessary that they spring away from the bristles in order to permit the jaws 16 to be drawn toward the bristles as the extensions of the wires are twisted. To this end the jaws 16 are not mounted directly on the main carriage 91 but on a frame 106 which slides within the sliding carriage 91. A spring 107 urges the carriage 106 rearwardly to separate the pairs of jaws, but the weight 93 connected through spring 94 with the main carriage 91 overpowers spring 107, when the jaws 16 only are gripping the wires, and draws carriage 91 away from the bristle-holding portions of the wires.

The remainder of the twisting machine is best seen in Fig. 10. The entire twisting head 33 is carried by a shaft member 111 which is journaled in a frame member 112. The shaft 111 carries a large cylindrical end portion 113 which in turn carries a jaw holder 114 and a jaw actuating cone 116. The jaw holder 114 carries the jaws 13, both of which are movable, and has pivoted thereto jaw actuating levers 117 which are operated by a sliding movement of the cone 116. The cone 116 is actuated by ring 118 which is operated by fingers 119 which, as seen best in Fig. 7, are operated by the cylinder 55. An antifriction thrust bearing indicated by 120 may be provided.

Within the cylindrical end portion 113 there is positioned a split cylindrical member 121 best seen in Fig. 11. This member carries the jaws 15 which are pivoted to the sides of the cylinder and a wedge-shaped actuator 122 arranged to operate the jaws 15 upon longitudinal movement. The longitudinal movement of the wedge 122 is accomplished by means of a rod 123. The rod 123 runs within a shaft 124 which carries the split cylinder 121 at one end and the air cylinder 71 at the other end. Within the air cylinder 71 the plunger 126 is rotatably secured to the rod 123 and is urged to the right as seen in Fig. 10 by spring 127. Thus, when no air pressure is supplied to the cylinder 71 the rod 123 will shift to the right and release the jaws 15. When air is supplied to cylinder 71, the air will press the plunger 126 and rod 123 to the left thereby actuating jaws 15 and firmly clamping the wires 11. Suitable antifriction bearings may be provided as indicated diagrammatically by the balls 128. To facilitate insertion of the wires, jaws 13, the orifices of cap 114, split cylinder 121, and jaws 15 are all beveled. The orfice in split cylinder 121 is completed by guide pieces 129 between the ends of the split portions.

As in the case of jaws 14 and 16 it is necessary that the jaws 13 and 15 contract after the jaws 13 have released. In other words, it is necessary for the jaws 13 to get out of the way of the bristles so as to permit contraction of the extensions 18 as it is twisted. This relative contraction of the jaws 13 and 15 (or diminution of the space between the two pairs of jaws) is accomplished by permitting the jaws 15 to slide toward the jaws 13. It has already been seen that the jaws 15 are carried by the split cylinder 121 which in turn is carried by the shaft 124. This entire assembly, therefore, is urged to the right as seen in Fig. 10 by spring 131. When the jaws 13 have been released, the weight 93 acting through the wires forming the brush and through jaws 15 will pull the entire assembly including jaws 15 to the left to the position shown in Fig. 10. The jaws 13 are made to rotate with the twisting head 33 by virtue of a key 132 secured to the split cylinder 121 and operating in a corresponding slot in the cylindrical member 113.

It is believed that there is no need to describe the construction of the clutch 31 in Fig. 10 since any conventional clutch may be used. It should be noted, however, that in the illustrated form the spring 133 tends to press the clutch into engagement and that therefore the spring 134 must be sufficiently powerful to overcome the spring 133 and release the clutch when the latch 43 is released.

In Fig. 10 a portion of the drive for the control mechanism may also be observed. A pulley 136 is carried by the cylindrical member 113 and keyed thereto. This pulley drives a belt 137 which drives a pulley 138. This pulley is connected through any suitable driving mechanism such as the universal joints and shafting 139 (Figs. 10 and 17) with a worm 141 which drives the worm gear 142 carried by shaft 34. When no air is supplied to shaft 34 through hose 57, shaft 34 is slid to the left by a spring 143 so that it is disconnected from gear 142 by virtue of the disengaged clutch 144. When air is supplied to shaft 34, however, it reacts on plunger 58, compresses spring 143, drives the trip arms 36, 37 and 41 into vertical alinement with the trip levers 38, 39 and 42, and causes engagement of clutch 144 to connect shaft 34 with the gear 142.

As seen best in Fig. 17, each of the trip arms 36, 37 and 41 are adjustably secured on the shaft 34 by means of a yoke 146 which may be tightened by a screw 147. The cam 76 may also be adjustable with respect to the shaft as by being slotted and secured by screws 145. A bushing 148 which carries the stop arm 87 may also form a pulley for winding up a cord 150 which carries the weight 86 and is tied to arm 87.

Each of the trip levers 38, 39 and 42 pivots with respect to its supporting shaft 152 and is limited in its return movement by a bar 153. These trip levers are positioned to be out of alinement with the corresponding trip arms during their return movement when the shaft 34 is in its left-hand position as seen in Fig. 16. In the forward movement of the trip arms 36, 37 and 41 they together with the shaft 34 are in the right-hand position and therefore they strike the trip levers 38, 39 and 42. The trip arm 87 is positioned in the opposite manner. It misses its trip lever 88 on its forward stroke and strikes it on the return stroke.

*Speed changing mechanism*

As previously stated, the cam 76 strikes the pivoted cam follower 77 to open valve 78 and supply air through hose 79 to cylinder 81 to change the speed of the twisting head, as seen best in Figs. 8 and 9. In Fig. 8 the parts are in their high speed position and in Fig. 9 they are in their low speed position.

The speed change is accomplished by means of one form of Reeves drive mechanism. The twisting head is driven by a pulley 161 which is carried by shaft 111. The pulley 161 is driven by a belt 162 which in turn is driven by a split pulley comprising the beveled disc 163 and the beveled disc 164, both of which are splined to the motor shaft 166 or a sleeve thereon. These discs are urged toward one another by a spring 167, the tension of which may be regulated by a hand screw 168. The motor and the pulley halves 163 and 164 are carried by a table 171 which is pivoted at 172 and controlled in its pivotal movements by cylinder 81. When in the position shown in Fig. 8 the shaft 166 is closest to the pulley 161 and hence the length of the belt 162 will permit the spring 167 to press the pulley portions 163 and 164 toward one another as seen in Fig. 7 so that the belt 162 rides near the periphery of the pulley portions 163 and 164. When air is supplied to the cylinder 81, however, the table 171 is tilted to the position shown in Fig. 9 and the shaft 166 is therefore moved farther away from the pulley 161 with the result that the belt 162 is drawn inwardly between the pulley portions 163 and 164, spreading these pulley portions apart so that the belt rides near the centers thereof as seen in Fig. 9.

*Miscellaneous details*

It should be understood of course that return springs may be provided wherever necessary. Thus, in Figs. 14 and 15 a return spring 176 is shown for each of the cams 48, 49, 62, and 63, and a return spring 177 is shown for each of the corresponding pawls. Likewise, return springs may be provided for the jaws and jaw actuating levers, for the plungers in the various operating cylinders, and for the valves, although in the latter case the air pressure may make such springs unnecessary.

Self-adjustment for new brush

One important detail of construction and operation which should be explained is that when the machine is at rest after one brush has been removed therefrom the various jaws will be in the proper longitudinal position to receive the wires for another brush. This is rather remarkable in view of the apparently irreconcilable fact that as soon as jaws 13 and 14 release during the twisting of the brush they snap toward the associated jaws 15 and 16 respectively so that they are not at that time, when they are apparently at rest, in position for receiving the wires for a new brush. However, it will be observed from Fig. 10 that when the cylinder 71 has permitted the jaws 15 to release the wires 11, the spring 131 will draw the split cylinder 121 and the jaws 15 to the right, so that they will be properly spaced apart for engaging the wires at the two desired points. Likewise, if the screws 95 are properly adjusted, the weight 93 will draw the carriage 91 to such a position that its jaws 14 are properly spaced from the jaws 13 for engaging the wires 11 just beyond the bristle-engaging portions thereof. Likewise, the spring 107 will draw the slide frame 106 to the left with respect to carriage 91. This will space the jaws 16 the proper distance from the jaws 14 for the initial engagement of the wires. When the medial jaws 13 and 14 release, both of springs 107 and 131 will yield under the tension put on the wires by weight 93, to permit the medial jaws to recede from the bristles.

The general operation was described at the first part of this description and therefore need not be repeated here in detail. From the foregoing it is seen, however, that a machine is provided which facilitates the placing of the wires and the bristles in the machine and which, once they have been placed, automatically twists the brush with a differential twisting force, applying a relatively great twisting force to the bristle-holding portions of the wires until they are twisted to the desired pitch, and then restrictedly twisting the extensions of the wires, the twisting of these extensions being automatically discontinued when they have been twisted to the desired pitch, even though the force required for twisting these extensions to this pitch is much less than the force required for twisting the bristle-holding portion of the brush to the desired pitch. After operation, the machine automatically returns to its original position so that it is ready to receive the wires for a new brush without further manual manipulation.

It should also be noted that no bristles are lost because during the entire twisting operation the bristles are kept centered on the wires by rotating against the usual guard plate 181. Heretofore when the wires were differentially twisted the end bristles were often or usually dropped out while the machine was stopped and the jaws were moved from the medial to the end positions. It should be explained that in order to keep the wires from breaking under the severe strain of twisting the bristle-holding portions of the wires, the two wires are separated slightly in the clamps, and hence do not grip the end bristles tightly even after the initial winding.

Although I have described my invention in its preferred embodiment, it is understood that it is not limited to this specific structure, but is limited only by the scope of the appended claims. The word "jaws" is used to mean any two clamping members. The word "bristles" is used to mean any brush-forming members clamped between the wires whether true bristles or not. "Wires" may be taken as meaning either two separate wires or two portions of a single doubled wire.

I claim:

1. Brush twisting apparatus for making a double-twisted wire brush in one automatic operation including a pair of opposed holding units each including two normally spaced pairs of jaws adapted to engage the wires of a brush, means for rotating the jaws in one of said units to twist the wires, and the jaws of one of the units being movable under tension longitudinally of the wires to permit the tensioned construction thereof as they are twisted, means for causing all of said jaws to originally engage the wires whereby the portion of the wires between the units will be twisted independently of the remaining portion of the wires, means for causing only the end jaws to engage the wires whereby the portions between the jaws within the units will be twisted, and means for applying tension to the wires as they are twisted, the spaced pairs of jaws of one of said units moving relatively toward one another under the influence of said tension when the end jaws only grip the wires to permit foreshortening of the wire originally between said pairs of jaws as it is twisted.

2. Brush twisting apparatus for making a double-twisted wire brush in one automotive operation including medial jaws adapted to grip the wires for a twisted wire brush adjacent the bristles thereof and relatively rotatable to twist the bristle-holding portion of said wires, additional jaws adapted to engage the wires at points spaced from the bristles and relatively rotatable to twist the extensions of said wires when the first mentioned jaws are released, and means for automatically rendering the medial jaws ineffective after the bristle-holding portions of the wires have been twisted a predetermined degree with all jaws originally gripping said wires and said additional jaws maintaining said gripping continuously through a complete operation.

3. Brush twisting apparatus for making a double-twisted wire brush in one automotive operation including medial jaws adapted to grip the wires for a twisted wire brush adjacent the bristles thereof and relatively rotatable to twist the bristle-holding portion of said wires, additional jaws adapted to engage the wires at points spaced from the bristles and relatively rotatable to twist the extensions of said wires when the first mentioned jaws are released, and means for automatically rendering the medial jaws ineffective after the bristle-holding portions of the wires have been twisted a predetermined degree and for thereafter rendering the end jaws ineffective to twist the wires further after the extensions have been twisted a predetermined degree with at least one of said jaws being continuously rotatable throughout the twisting operation.

4. Brush twisting apparatus for making a double-twisted wire brush in one automatic operation including a pair of opposed holding units each including two normally spaced pairs of jaws adapted to engage the wires of a brush, means for rotating the jaws in one of said units to twist the wires, and the jaws of one of the units being movable under tension longitudinally of the wires to permit the tensioned contraction thereof as they are twisted, means for causing all of said jaws to engage the wires whereby the portion of the wires between the units will be twisted independently of the remainder of the wires, means for causing only the end jaws to engage the wires whereby the portions between the jaws within the units will be twisted, means for applying tension to the wires as they are twisted, the spaced pairs of jaws of one of said units moving relatively toward one another under the influence of said tension when the end jaws only grip the wires to permit foreshortening of the wires originally between said pairs of jaws as it is twisted, one of said units being mounted to move toward and from the other unit and having first and second support members relatively movable in the same direction, one pair of jaws being carried by each of said support members, and biasing means for biasing the movable unit away from the other unit, and drawing said pairs of jaws toward one another when only the jaws most remote from said other unit grip the wires and for separating the pairs of jaws when neither pair grips the wires.

5. Brush twisting apparatus including medial jaws adapted to grip the wires for a twisted wire brush adjacent the bristles thereof and relatively rotatable to twist the bristle-holding portions of said wires, additional jaws adapted to engage the wires at points spaced from the bristles and relatively rotating to twist the extensions of said wires, self-locking manually controlled means for causing one medial pair of jaws to grip the wires, self-locking manually controlled means for causing the other medial pair of jaws and the end pairs of jaws to grip the wires and to start the relative rotation of the jaws at opposite end portions of the wires, and automatically controlled means for causing the release of the locking means as to the medial jaws when the portions of the wires therebetween have been twisted a predetermined degree.

6. Brush twisting apparatus including medial jaws adapted to grip the wires for a twisted wire brush adjacent the bristles thereof and relatively rotatable to twist the bristle-holding portions of said wires, additional jaws adapted to engage the wires at points spaced from the bristles and relatively rotating to twist the extensions of said wires, self-locking manually controlled means for causing one medial pair of jaws to grip the wires, self-locking manually controlled means for causing the other medial pair of jaws and the end pairs of jaws to grip the wires and to start the relative rotation of the jaws at opposite end portions of the wires, and automatically controlled means for causing the release of the locking means as to the medial jaws when the portions of the wires therebetween have been twisted a predetermined degree and for releasing the locking means as to the other jaws when the portions of the wires therebetween have been twisted to a predetermined degree.

7. Brush twisting apparatus including medial jaws adapted to grip the wires for a twisted wire brush adjacent the bristles thereof and relatively rotatable to twist the bristle-holding portions of said wires, additional jaws adapted to engage the wires at points spaced from the bristles and relatively rotating to twist the extensions of said wires, self-locking manually controlled means for causing one medial pair of jaws to grip the wires, self-locking manually controlled means for causing the other medial pair of jaws and the end pairs of jaws to grip the wires and to start the relative rotation of the jaws at opposite end portions of the wires, and automatically controlled means driven in a predetermined relationship with the relative rotation of the jaws for causing the release of the locking means as to the medial jaws when the portions of the wires therebetween have been twisted a predetermined degree and for releasing the locking means as to the other jaws when the portions of the wires therebetween have been twisted to a predetermined degree.

8. Brush twisting apparatus including medial jaws adapted to grip the wires for a twisted wire brush adjacent the bristles thereof and relatively rotatable to twist the bristle-holding portions of said wires, additional jaws adapted to engage the wires at points spaced from the bristles, driving means for rotating one medial jaw and the associated additional jaw to twist the brush, and means effective while said rotation continues for causing the medial jaws to disengage the wire to cause the portions of the wires therebeyond to be twisted.

9. Brush twisting apparatus including medial jaws adapted to grip the wires for a twisted wire brush adjacent the bristles thereof and relatively rotatable to twist the bristle-holding portions of said wires, additional jaws adapted to engage the wires at points spaced from the bristles, driving means for rotating one medial jaw and the associated additional jaw to twist the brush, means effective while said rotation continues for causing the medial jaws to disengage the wire to cause the portions of the wires therebeyond to be twisted, and means effective before the medial jaws release for changing the driving means to cause it to twist the wires with more speed and less force.

10. Brush twisting apparatus including a wire-holding unit having wire-holding means, and a twisting unit, including a first rotatable shaft, means for rotating the shaft, a head on the shaft having a pair of jaws, a ring actuator for the jaws, means to operate said actuator as the shaft and jaws rotate, a second shaft keyed to and concentric with the first shaft and having a head including second jaws, a third shaft concentric with the other shafts, adapted at one end to actuate said second jaws and adapted at the other end to be actuated as said shafts and jaws rotate.

11. Brush twisting apparatus including medial pairs of jaws adapted to grip the wires for a twisted wire brush adjacent the bristles thereof and relatively rotatable to twist the bristle-holding portions of said wires, additional jaws adapted to engage the wires at points spaced from the bristles and relatively rotating to twist the extensions of said wires when the first mentioned jaws are released, and treadle means for first causing one pair of jaws to engage the wires, and after a subsequent actuation causing the other jaws to engage the wires and the rotation of the jaws to commence.

12. The method of twisting a brush in a continuous non-stopping operation which includes the steps of clamping a pair of wires slightly spaced apart in a pair of jaws, inserting bristles between the wires adjacent the jaws, clamping the wires in another pair of jaws adjacent the bristles and in a third pair of jaws spaced from the bristles, rotating the jaws at one side of the bristles to twist the bristle-holding portions of the wires, while maintaining the bristles centered thereon, and releasing the jaws between the bristles and the third pair of jaws to cause the rotation to twist the portion of the wire between the bristles and the third pair of jaws with said rotation continuing during said releasing.

13. Apparatus for manufacturing a double-twisted wire brush in a continuous operation including a pair of jaw units spaced apart longitudinally with one jaw unit being continuously rotatable during the twisting operation to complete a brush, and the other jaw unit comprising a pair of wire gripping jaws, with the jaws of said other unit being mounted to provide relative longitudinal movement therebetween, and said pair of jaw units being mounted to provide relative longitudinal movement between the units.

14. Apparaus for manufacturing a double-twisted wire brush in one continuously moving operation including a pair of outer jaws and a pair of medial jaws with all of said jaws mounted longitudinally in said apparatus and all jaws adapted to originally grip wire to be twisted, means for rotating a medial jaw and a corresponding outer jaw while all four jaws are gripping the wire, means for releasing one of said pair of jaws from the wire without stopping operation of the apparatus and continuing the twisting operation with the other pair of jaws to a predetermined twisted condition.

15. Apparatus for manufacturing a double-twisted wire brush in a continuous automatic operation, including a pair of jaw units spaced apart from one another, one of said jaw units including a continuously rotating jaw, and the other of said jaw units including a pair of non-rotatable jaws but with said latter pair of jaws being movable longitudinally relative to one another, and said other jaw unit and one jaw unit being mounted to provide relative longitudinal movement therebetween, with both units adapted to originally grip wire to be twisted, and means for releasing one of said jaws in said other unit from said wire while maintaining the other jaw therein in gripping relation, and continuing the twisting of the wire with rotation of the jaw in the other unit in continuous operation.

16. Apparatus for manufacturing a twisted wire brush in two twisting steps but with continuous operation for said two steps, including a pair of medial jaws and a pair of outer jaws with an outer jaw and a medial jaw disposed in a unit spaced from the other outer jaw and the medial jaw in a corresponding unit, with all of said jaws adapted to originally grip wire to be twisted, means for rotating one jaw unit, means for releasing one of the pairs of jaws while maintaining the other pair of jaws in gripping relation and continuing the operation of the apparatus during such releasing, and continuing the rotation of the remaining jaw in the rotating jaw unit to a predetermined condition of twisting for such wire.

17. Brush twisting apparatus for manufacturing a double-twisted wire brush in one automatically controlled operation which is continuous after the apparatus is set into motion, said apparatus including a frame, two sets of wire-clamping jaws mounted on said frame with each set comprising an outer jaw and an inner jaw spaced longitudinally on the frame, with all four jaws originally clamping the wire to be twisted, means for rotating both jaws in one set while the jaws in the other set are non-rotatable, and means for automatically releasing one jaw in one set and a corresponding jaw in the other set from the wire during the continuous operation and after an original twisting operation, with the remaining jaw in the rotating set continuing to rotate while the other remaining jaw is non-rotatable but with one of the remaining jaws longitudinally movable toward the other remaining jaw during the final portion of the twisting operation.

18. Apparatus for manufacturing a twisted wire brush having a bristle portion in the wires, including four clamping means with two of the clamping means positioned in the apparatus on opposite sides of the brush bristle portion, and each of the two remaining clamping means being outwardly disposed from an associated one of the two clamping means, operating means for clamping said four clamping means on the brush wire, and means for releasing said first mentioned two clamping means from said brush wire at a predetermined time while retaining the two remaining clamping means clamped thereon, and means for rotating one of the first mentioned two clamping means and the associated one of the two remaining clamping means for twisting the wire of the brush.

19. In an apparatus as defined in claim 18, means mounting said four clamping means so as to provide relative longitudinal movement between each one of the two clamping means and its associated one of the two remaining clamping means during the brush manufacturing operation.

20. In an apparatus as defined in claim 18, said rotating means rotating one of the two clamping means and the associated one of the two remaining clamping means in an initial twisting operation and said one remaining clamping means in a second twisting operation, and control means for retarding the speed of rotation of said rotating clamping means at the end of the period of initial twisting of the wire and before the beginning of the second twisting operation.

21. Apparatus for manufacturing a twisted wire brush having a bristle portion in the wires including medial clamping means having two longitudinally spaced parts with each part clamping the wires adjacent an end of the bristle portion, outer clamping means having two parts with each part longitudinaly spaced from an associated medial clamping means part, means for mounting said medial and outer clamping means so that there is relative longitudinal movement between associated parts thereof, and means for providing relative longitudinal movement between each medial clamping means part and the adjacent end of the bristle portion upon release of said medial clamping means from said wires.

22. Apparatus for manufacturing a twisted wire brush having a bristle portion, including medial clamping means having two parts and end clamping means having two parts for clamping on to wire for the wire brush in a position such that the bristle portion is arranged intermediate the two parts of the medial clamping means, with a part of each of the end clamping means being disposed laterally from the associated part of the medial clamping means and away from the bristle portion, means for maintaining all of said parts of said clamping means clamped to the brush wire during a portion of the complete manufacturing operation, means for releasing said medial clamping means while retaining said end clamping means in clamping position on the wire, and mounting means for each part of said medial clamping means and an associated part of said end clamping means to permit relative longitudinal movement between said associated parts.

23. Apparatus for manufacturing a double-twisted wire brush having a bristle portion including a pair of jaw units longitudinally spaced apart from one another so that the bristle portion of the brush is arranged between said jaw units during the normal operation of said apparatus, said jaw units being relatively movable longitudinally and each of said units being comprised of an inner and an outer wire-gripping jaw with the inner jaw of each unit adjacent an end of the bristle portion with all of said jaws at one time gripping the wire being twisted, means for rotating one of said jaw units to twist the wire at the bristle portion, and means for releasing said inner gripping jaw in each unit after such twisting of the wires while maintaining the outer gripping jaws gripped to the wire, the twisting operation being continued with the outer gripping jaws to twist the wire laterally of the bristle portion to a predetermined twisted condition, with the inner and outer jaws of each jaw unit being relatively movable longitudinally and the inner jaws being longitudinally movable away from the bristle portion for the second twisting operation.

24. The method of twisting a double-twisted wire brush which includes the steps of clamping wires in a pair of clamping means, inserting bristles between the wires adjacent said pair of clamping means, clamping the wires in a second pair of clamping means with said second pair of clamping means spaced longitudinally from the first pair of clamping means with the bristles arranged therebetween, rotating one of said pair of clamping means to twist the wires in an initial twisting operation, releasing one clamping means in each of said pair of clamping means while maintaining the second clamping means in each pair clamped to the wires, and twisting the wires in a second twisting operation.

25. The method of twisting a wire brush in two twisting operations, which method includes clamping brush wires between a pair of medial jaws and a pair of end jaws, twisting the wires in an initial twisting operation by rotating one of the pair of medial jaws and an associated one of the pair of end jaws, releasing the medial jaws from said wires while maintaining the end jaws clamped to said wires, and twisting said wires in a second twisting operation by rotating one of said end jaws.

26. Apparatus for twisting a plurality of wires including frame means, a wire holding unit and a wire-twisting unit supported on said frame means, with the wire-twisting unit including a hollow rotatable shaft journalled in said frame means, a pair of jaws pivotally mounted on the outside of said hollow shaft, a second shaft supported within said hollow shaft, a second pair of pivotal jaws operatively connected to said second shaft and supported thereby, means on the outside of said hollow shaft for pivoting the first pair of jaws to apply a clamping pressure thereby, means on the inside of said hollow shaft for pivoting the second pair of jaws, with said first pair of jaws and said second pair of jaws being relatively longitudinally movable.

27. In apparatus as defined in claim 26 with the means on the outside of said hollow shaft for pivoting the first pair of jaws including a substantially cone-shaped member longitudinally movable relative to said first pair of jaws for slidable engagement therewith, and with said means on the inside of the hollow shaft for pivoting the second pair of jaws including a wedge-shaped member longitudinally movable relative to said second pair of jaws and slidably engaging the same.

28. Apparatus for twisting a plurality of wires including a plurality of clamping jaws adapted to clamp and be released from the wires in a predetermined cycle, and means for controlling and accomplishing the clamping and releasing including a shaft mounted for rotary and axial movement, a plurality of trip arms mounted on said shaft and movable therewith, a corresponding plurality of trip levers actuatable by said arms, fluid means for shifting said shaft axially to bring said trip arms into radial alignment with said trip levers to actuate said levers upon rotary movement of said shaft, and means for moving said shaft axially to take said trip arms out of radial alignment with said trip levers to permit rotary movement of said arms with said shaft out of striking alignment with said levers.

JOHN G. BAUMGARTNER.